United States Patent Office 3,819,762

Patented June 25, 1974

3,819,762

POLYMERS OF ACRYLONITRILE AND AROMATIC OLEFINS WHICH OPTIONALLY CONTAIN GRAFTED RUBBER

King Lau Howe, Wilmington, Del., assignor to E. I. du Pont de Nemours and Company, Wilmington, Del.

No Drawing. Filed Nov. 17, 1971, Ser. No. 199,766
Int. Cl. C08f *19/18*
U.S. Cl. 260—876 R 16 Claims

ABSTRACT OF THE DISCLOSURE

A composition consisting essentially of (A) 65 to 100 percent by weight of a polymer consisting essentially of 76 to 85 percent by weight acrylonitrile polymerized units and 24 to 15 percent by weight polymerized units of at least one aromatic olefin containing 8 to 14 carbon atoms, said polymer having a melt viscosity of $10^4$ to $10^6$ poises at 220° C. and an inherent viscosity of from 0.3 to 1.0 deciliter per gram and (B) 0 to 35 percent by weight of grafted rubber, said grafted rubber consisting essentially of 30 to 50 percent by weight of a graft polymer consisting essentially of 76 to 85 percent by weight acrylonitrile polymerized units and 24 to 15 percent by weight polymerized units of at least one aromatic olefin containing 8 to 14 carbon atoms, and 50 to 70 percent by weight rubber; said composition having a carbon dioxide permeability of less than 0.045 barrer; and shaped articles made therefrom.

This invention relates to acrylonitrile/aromatic olefin copolymers. Particularly, this invention relates to copolymers of acrylonitrile and aromatic olefins wherein the copolymers contain 76 to 85 percent by weight acrylonitrile polymerized units, said copolymers having a critical melt viscosity and inherent viscosity. More particularly, this invention relates to compositions containing acrylonitrile/aromatic olefin copolymers and optionally grafted rubber; the permeability of the composition being critical.

Copolymers of acrylonitrile and vinylidene aromatic compounds, lower alpha, monoolefins of 2 to 8 carbon atoms or methylene glutaronitrile have been discussed. Blends of such copolymers with 0 to 25 parts by weight of a grafted preformed rubber have also been discusssed (U.S. Pat. 3,451,538). The preparation of copolymers of acrylonitrile and aromatic olefins is discussed in British Pat. 1,185,305.

The copolymers of acrylonitrile and aromatic olefins heretofore prepared have not been sufficient for end uses in items such as beverage bottles for they failed in one or more of the following properties: melt stability, melt viscosity, permeability and toughness. In beverage bottles, it is important to have the weight of the bottle as low as possible so that the amount of polymer utilized is kept to a minimum. Therefore, permeability and toughness of the materials out of which the bottles are prepared must be at an optimum for the materials to be sufficient. Another factor, however, which is critical is the melt viscosity of the material which is to be processed into a bottle. The melt viscosity must be such that the bottle can be easily prepared from the material and the material must be stable during such processing.

A composition has been found which has a combination of properties which fulfills the requirements heretofore set forth as critical. It is a composition consisting essentially of (A) 65 to 100 percent by weight of a polymer consisting essentially of 76 to 85 percent by weight acrylonitrile polymerized units and 24 to 15 percent by weight polymerized units of at least one aromatic olefin containing 8 to 14 carbon atoms, said polymer having a melt viscosity of $10^4$ to $10^6$ poises at 220° C. and an inherent viscosity of 0.3 to 1.0 deciliter per gram, and (B) 0 to 35 percent by weight of grafted rubber, said grafted rubber consisting essentially of 30 to 50 percent by weight of a graft polymer consisting essentially of 76 to 85 percent by weight acrylonitrile polymerized units and 24 to 15 percent by weight polymerized units of at least one aromatic olefin containing 8 to 14 carbon atoms, and 50 to 70 percent by weight rubber; said composition having a carbon dioxide permeability of less than 0.045 barrer.

The preferred aromatic olefins are styrene, 4-methyl styrene, 4-(t-butyl)styrene, 3-methyl styrene, 2,4-dimethyl styrene, 2,6-dimethyl styrene, and 2,4-diisopropyl styrene. Styrene is the most preferred. Combinations of the aromatic olefins can be utilized. Alpha, methyl styrene can be used in combination with one of the above styrenes, preferably styrene which is not substituted. The preferred amount of acrylonitrile polymerized units in the polymer is 78 to 82 percent by weight while the preferred amount of the aromatic olefin polymerized units is 22 to 18 percent by weight. The composition is preferably 80 to 90 percent by weight of component (A) and 10 to 20 percent by weight of component (B).

The grafted rubber is optional but if it is present it normally contains 30 to 50 percent by weight, preferably 33 to 40 percent by weight, of a graft polymer which consists essentially of 76 to 85 percent by weight acrylonitrile polymerized units and 24 to 15 percent by weight aromatic olefin polymerized units. The remainder of the grafted rubber is the rubber which is normally 50 to 70 percent by weight, preferably 60 to 67 percent by weight, of the grafted rubber. Representative of rubbers which are useful in the composition are those of conjugated dienes. The conjugated diene polymerized units of such rubbers normally comprise 50 to 100 percent by weight of the rubber. The rubber can contain 0 to 50 percent by weight polymerized units selected from the class consisting of styrene polymerized units, acrylonitrile polymerized units, and mixtures thereof. The preferred conjugated dienes are butadiene and isoprene. A preferred rubber is one comprising 80 percent by weight butadiene polymerized units and 20 percent by weight styrene polymerized units.

The graft polymer of the grafted rubber of optional component (B) of the composition normally has a composition similar to that of the polymer of component (A). Such a similarity is desirable in that it promotes the compatability of components (A) and (B) and the clarity of the final composition. Preferably, the composition of the graft polymer is 76 to 82 percent by weight acrylonitrile polymerized units and 24 to 18 percent by weight polymerized units of the aromatic olefin. Aromatic olefins which are preferred in the graft polymer are the same as those recited above for the polymer of component (A).

As stated above, it is critical that the melt viscosity of the polymer of component (A) be within the range of $10^4$ to $10^6$ poises at 220° C. Melt viscosity as used throughout the specification and in the claims is measured with a cone and plate rheometer at a stress $7.9 \times 10^3$ dynes per $cm.^2$. The apparatus used for determining melt viscosity is described in "Stress Relaxation After Steady Shearing: Applications and Empirical Representation" by E. Menefee in the *Journal of Applied Polymer Science*, vol. 8, pp. 849–861, 1964. The initial value of viscosity is the value reported as melt viscosity.

The melt viscosity range stated above is required for the composition to be processable into shaped articles, particularly beverage bottles for the manufacture of such shaped articles is normally accomplished by extrusion-blow molding or injection-blow molding of the composition. To be most useful as far as melt processability is concerned, the composition should have a melt viscosity of from $2\times10^4$ to $4\times10^5$ poises at 220° C. Compositions containing component (A) polymers which consist of more than 85 percent acrylonitrile polymerized units become prohibitively viscous with regard to melt processability.

The composition must also be melt stable. The melt stability is determined by measuring the melt viscosity continuously (as described above) for a period of one hour. The curve of log $\eta_o$ versus time can be characterized by two quantities $S_1$ and $S_2$. These are the values of $d(\log \eta_o)/dt$ in the intervals 0–20 minutes and 20–60 minutes respectively. For particularly stable compositions a single value suffices for the 60-minute period. From these quantities can be calculated the value of $T_2$, the time in minutes for the melt viscosity to double ($T_2=41.6/S_1$). If the value of $T_2$ is much greater than 20 minutes, an average value of $S_1$ and $S_2$ can be used for $S_1$. $T_2$ is therefore a measure of melt stability. A composition with good melt stability is required for molding, particularly for continuous type molding operations. Such stability allows one to set the molding machine at certain conditions which will not change for lengthy periods of time. Another reason for requiring that the composition have good melt stability is that it is possible to regrind such a composition and reprocess it through molding equipment.

In order for the composition to have useful properties after it is formed into the shaped articles, i.e., resistance to creep and high impact strength, it is necessary that the inherent viscosity of the polymer of component (A) which is an indication of molecular weight be within the range stated above, i.e., from 0.3 to 1 deciliter per gram. Inherent viscosity is measured on a 0.5 gram per deciliter solution of the polymer in $\gamma$-butyrolactone at 35° C. Inherent viscosity is defined as $\ln(\eta_r)/c$, where $\eta_r$ is the relative viscosity (flow time of solution/flow time of solvent) and $c$ is the concentration of polymer in g./dl. The inherent viscosity is determined on a Ubbelohde viscometer.

Permeability is an important consideration in the preparation of shaped articles, particularly bottles; specifically beverage bottles. It is necessary that the carbon dioxide permeability of the composition be less than 0.045 barrer in order for the composition to be useful. Permeability is decreased as acrylonitrile content increases in the composition. The carbon dioxide permeability of the polymer of component (A) of the composition should normally be less than 0.02 barrer. The rubber in component (B) of the composition is less resistant to permeation of carbon dioxide than the polymer of component (A) or of the graft polymer of component (B). Therefore, the permeability of the composition as a whole, if grafted rubber is utilized, is somewhat more than the permeability of the polymer of the graft and of component (A).

Carbon dioxide permeability measurements are made following the procedure outlined in ASTM D–1434 (Method M). Permeability is expressed in barrers which have the units $$\frac{10^{-10}\ (\text{cc. carbon dioxide at standard temp. and pressure})\ (\text{cm.})}{(\text{cm.}^2)\ (\text{second})\ (\text{cm. mercury})}$$

The polymer of component (A) can be prepared by either a batch process in an emulsion system or a continuous process. In the batch emulsion method, generally all of the acrylonitrile is added at the beginning together with enough aromatic olefin to yield a copolymer of the desired composition. It is important that the concentration of the olefin be maintained as close as possible to this initial concentration during the subsequent polymerization. For the range of polymers disclosed here, the composition of the polymer being formed at any instant is extremely sensitive to the (small) concentration of olefin. If this concentration is allowed to fall by more than 25 percent of the desired value, long sequences of acrylonitrile residues will be present in the polymer and provide sites for rapid local degradation during processing. This causes a substantial increase in melt viscosity and decreased melt stability. The careful control of the monomer concentrations provides the ability to produce the polymers described of this invention. One method for achieving this control involves first deciding on a rate of addition of olefin to the reaction and measuring the actual composition being formed by gas chromatographic analysis of the monomer present in the reaction vessel. The reaction rates can then be used to calculate new feed rates for a second experiment, and these new feed rates generally yield a satisfactory product.

The grafted rubber of component (B) can be prepared using the techniques described above in the presence of rubber.

If an emulsion polymerization process is used, the products of the synthesis are in the form of polymer latices. According to the particular composition desired, the polymer of component (A) latices and optionally the rubber containing latices are stirred together and coagulated by usual methods, such as heating with steam, addition of salts of multivalent metals or freezing and thawing. The coagulated crumb is then dried and freed from residual monomer and compounded by extrusion at about 200° C. to 220° C. to convert it to molding powders. (Vacuum extraction of residual water or monomer may be desirable during this step.)

Small to moderate quantities of additives may be added as desired to the compositions, for example, antioxidants and other stabilizers, pigments and dyes. These can be incorporated by conventional methods; for instance, by adding them to the powdered composition before compounding by extrusion or other suitable mixing methods or by dry blending with the compositions in molding powder form and re-extruding.

The composition is useful as various shaped articles and as films. Particular shaped articles of interest are bottles, particularly beverage bottles. Such may be prepared by conventional methods such as extrusion and injection blow molding.

The properties of the compositions, particularly toughness, are significantly improved by orientation. The orientation is normally carried out by rapidly stretching the composition at temperatures below those necessary for melt processing but above the heat distortion temperature, (for example, in the range 120° C. to 180° C.) and then cooling rapidly to below the heat distortion temperature. Two exemplary methods of producing orientation are vacuum forming and the method described in "Waste-Free Cold Parison Blow Molding" by Jack E. Hauck, *Modern Plastics*, October 1970. One preferred beverage bottle is made by biaxially orienting a composition which is 100 percent by weight of component (A).

The following examples are meant to illustrate but not to limit the invention. Parts and percentages are by weight unless otherwise specified.

In the examples melt flow was determined as described in ASTM D–1238 with the following provisions: load—5060 g., die—0.082″ diameter, and temperature—220° C. The value of the other properties related in the Examples were determined by procedures recited therewith or by the procedures set forth above.

EXAMPLE I

To a batch autoclave of 14 gallons net capacity were charged 46.5 pounds of water, 18.2 pounds of acrylonitrile, 131 ml. styrene, 76.3 grams of lauryl mercaptan, 900 cc. of a ten percent solution in water of (p-nonyl phenyl)-omega-hydroxypoly(oxyethylene) [mixture of dihydrogen and monohydrogen phosphate ester with an acid number at pH 5.2 of 62–72—General Aniline and Film Co.]. Before addition, the 10 percent solution was brought to a pH of 7 by adding ammonium hydroxide. The charge was stirred at 150 r.p.m. and heated to 60° C. by passing warm water through the jacket of the autoclave. Prior to heating oxygen was removed from the autoclave by bubbling a slow stream of nitrogen through the batch. A solution of 2.9 grams of potassium persulfate in 72 cc. of water was then added. After an induction period of 58 seconds, the start of the reaction was signalled by a rise in temperature of about 0.2° C. At this time, addition of 101.8 grams of lauryl mercaptan in 4.4 pounds of styrene was begun. Addition of this monomer solution was continued for the balance of the run at a rate designed to hold the ratio of styrene monomer to acrylonitrile monomer in the autoclave at a constant value. After 60 minutes of reaction time the addition of an additional 1070 cc. portion of the 10 percent solution of (p-nonyl phenyl) omega-hydroxypoly(oxyethylene) described above was commenced. It was added over an 80-minute period. The total reaction time was 200 minutes.

The batch temperature ranged from 60 to 60.8° C. over the course of the run and was controlled by adjusting the temperature of the water fed to the jacket of the autoclave. Samples of the reaction mixture were withdrawn after 20, 40, 60, 80, 100, 130, 160, and 200 minutes of the reaction. These were analyzed for styrene and acrylonitrile monomers by gas chromatography. These analyses are listed in Table 1.

TABLE 1.—MONOMER CONCENTRATIONS DURING POLYMERIZATION REACTION

| Reaction time, mins. | Concentration, percent by weight | | S/AN $\times 10^2$ | S/AN= 0.0143 | Conversion of AN, percent |
|---|---|---|---|---|---|
| | Acrylonitrile (AN) | Styrene (S) | | | |
| 0 | 23.6 | 0.376 | 1.59 | 1.11 | 0 |
| 20 | 23.4 | 0.356 | 1.52 | 1.06 | 0.9 |
| 40 | 20.5 | 0.292 | 1.42 | 0.99 | 13.1 |
| 60 | 17.9 | 0.227 | 1.27 | 0.889 | 24.2 |
| 80 | 15.1 | 0.197 | 1.30 | 0.91 | 36.0 |
| 100 | 12.7 | 0.159 | 1.25 | 0.875 | 46.2 |
| 130 | 9.68 | 0.134 | 1.38 | 0.965 | 59.0 |
| 160 | 6.26 | 0.0912 | 1.46 | 1.02 | 73.5 |
| 200 | 5.28 | 0.0831 | 1.57 | 1.1 | 77.6 |

The Table indicates that a constant monomer composition ratio was maintained throughout the reaction. Maximum deviation from the goal of S/AN=0.0143 was 12.5 percent. The final conversion of acrylonitrile was 77.6 percent. The overall composition of the polymer calculated from gas chromatography analysis was 78.8 percent by weight acrylonitrile polymerized units.

After 200 minutes the reactor was rapidly cooled down and the polymer emulsion was discharged. A portion of the emulsion was coagulated by freezing and the resulting polymer crumb was filtered, washed with water 3 times and once with methanol and dried in a vacuum oven at 80° C. for 24 hours. The dried polymer had a melt flow of 1.7 decigrams per minute. The nitrogen content was determined to be 20.5–21.04 percent by the Dumas procedure (determined on CHN Analyzer No. 185 made by F and N Instrument Company, Avondale, Pa.). This corresponded to acrylonitrile content of 77.6 to 79.6 which agreed well with the value of 78.8 from the gas chromatography analysis.

The melt stability of the polymer was excellent having an estimated time for a two-fold increase in melt viscosity at 220° C. of at least 12 hours. The melt viscosity of the polymer was $1.0 \times 10^5$ poises at 220° C. while the inherent viscosity was 0.56 deciliter per gram.

EXAMPLE II

A 4-liter flanged, jacketed, glass reactor was equipped with a mechanical stirrer, thermocouple, reflux condenser and sampling port. Constant reaction temperature was maintained by adjusting the temperature of the water circulated through the reactor jacket. The reactor was thoroughly purged with nitrogen before use. The following ingredients were charged to the reactor:

Acrylonitrile, 825 grams
Styrene, 11.72 grams (p - Nonyl phenyl) - omega-hydroxypoly(oxyethylene) (mixture of dihydrogen and monohydrogen phosphate ester with an acid number at pH 5.2 of 62–72—General Aniline and Film Co.), 8.25 grams in a 200 ml. solution—pH adjusted to 6.8 with ammonium hydroxide
Lauryl mercaptan, 3.81 grams
Water, 2000 mls.

The water was distilled water and the reactor was purged overnight with nitrogen perior to use. The organic ingredients had been degassed to remove oxygen by alternately evacuating and purging with nitrogen three times.

The reactants were heated and stabilized in temperature at 60° C. Initiator solution (7.2 mls. of a solution of 1 gram of potassium persulfate in 25 ml. of distilled water) was injected. The temperature was followed closely to detect the onset of polymerization. Twelve minutes after the addition of the initiator a rise of about 0.5° C. in temperature was observed. At this time the addition of the styrene solution was commenced. The styrene solution consisted of 400 grams styrene and 10.2 grams of lauryl mercaptan. The reaction rates at various times had been determined by gas chromatographic analysis of reaction mixtures taken during previous runs. Thus, the following feed rates for the styrene solution were calculated on the basis of the rates of reaction of acrylonitrile in previous experiments.

TABLE II

| Time (minutes) (after onset of polymerization) | Expected rate, R,[1] percent/minute | Styrene solution feed rate [2] (cc./minute) |
|---|---|---|
| 0–25 | 0.45 | 1.02 |
| 25–80 | 0.62 | 1.38 |
| 80–100 | 0.50 | 1.15 |
| 100–130 | 0.40 | 0.90 |

[1] R=Percent of acrylonitrile in initial charge reacting per minute.

[2] Styrene solution feed rate for an 80/20 AN/styrene copolymer $=\frac{R}{d}$[825/4-styrene (initial charge)]+Rx(RSH) where R is defined in footnote 1.

NOTE.—$d$=density of styrene, and (RSH)=volume of lauryl mercaptan to be fed if all of the acrylonitrile reacted.

During the polymerization samples were withdrawn for analysis starting with the onset of polymerization with the following results:

| Time (minutes) | 0 | 10 | 25 | 40 | 60 | 80 | 100 | 130 |
|---|---|---|---|---|---|---|---|---|
| Styrene/AN (percent) | 1.20 | 1.43 | 1.19 | 1.31 | 0.997 | 1.02 | 1.07 | 1.36 |
| Styrene/AN ratio relative to initial (percent) | 100 | 119 | 99 | 109 | 83 | 85 | 89 | 113 |

The average deviation from the initial ratio was 11 percent. Conversion at 130 minutes was 77.4 percent at which time the addition of styrene was stopped and the reaction mixture cooled rapidly. Copolymer latex was coagulated by freezing and thawing. The filtered copolymer was washed with water and dried in a stream of nitrogen at 75° C. The product contained 82 percent by weight acrylonitrile polymerized units based on the percent nitrogen determined by the Dumas method (same as Example I). The resin was injection molded at 220° C. into clear plaques. It had a melt flow of 0.4 gram per 10 minutes. The following properties were obtained:

| Property | Value |
|---|---|
| Notched Izod impact strength (ft.-lb./inch) (ASTM D–256) | 0.52 |
| Heat deflection temperature (° C. at 264 p.s.i.) (ASTM D–648) | 86 |
| Tensile strength at yield (p.s.i.) (ASTM D–638) | 14,200 |
| Percent elongation at break (ASTM D–638) | 14 |
| Tensile modulus (p.s.i.) (ASTM D–638) | 760,000 |
| Permeability to carbon dioxide (Barrer) | 0.004 |

EXAMPLE III

The 4-liter reactor of Example II was utilized in this Example. The initial charge to the reactor consisted of the following:

20% styrene/80% butadiene (by weight), rubber latex, 935.3 grams (390 gs. of rubber on a solid basis) contains 8.3 gs. free styrene
Acrylonitrile, 47 grams
Water (distilled), 1354.7 mls.

The latex diluted with the water was neutralized with diluted sulfuric acid (one concentrated sulfuric acid: 10 water) to a pH of 6.5. The diluted latex and acrylonitrile were mixed and air removed by alternate evacuation and blanketing with nitrogen 3 times. The reactants were heated to 60° C. and 55 mls. solution of 6 grams of potassium persulfate in 100 mls. of water, were added. Following the addition of the persulfate initiator, a solution consisting of 80 percent acrylonitrile and 20 percent styrene by weight was fed continuously into the reactor at a rate of 1.09 mls. per minute for 230 minutes. The reactor contents were cooled and 8.2 grams of a 40 percent solution of 2,6-di-t-butyl-4-hydroxymethyl phenol was added in dispersion form. The reactor contained 43.9 grams of acrylontrile monomer and 2.8 grams of styrene monomer after the reaction. The graft polymer on the rubber was 79.2 percent by weight acrylonitrile polymerized units, the determination being made by gas chromatographic analysis.

To 3000 parts of polymer prepared as in Example IV were added 640 parts of the grafted rubber above. The mixture was coagulated in aqueous magnesium sulfate solution, filtered, washed and then dried in a vacuum oven under nitrogen purge for 12 hours. The dried polymer was extruded through a 1-inch diameter extruder at a melt temperature of 200° C. The extruded product had excellent clarity. Melt flow at 220° C. was 1.1 g./10 minutes. Notched Izod impact strength (ASTM D–256) measured on compression molded specimens was 1.09 ft.-lb./inch.

EXAMPLE IV

To a 100-gallon jacketed stirred reactor were charged 385 pounds water, 3.6 pounds of (p-nonyl phenyl)-omega-hydroxypoly-(oxyethylene) (same as in Example I) dissolved in 33.3 lbs. of water (pH adjusted to 7.0 plus or minus 0.05 with 28 percent ammonium hydroxide), 159.2 lbs. of a mixture of 158 lbs. acrylonitrile and 1.2 lbs. lauryl mercaptan, 2.83 lbs. of a mixture of 57.3 lbs. styrene and 2.7 lbs. lauryl mercaptan. The system was degassed by purging with nitrogen and evacuating with agitation. This was repeated 3 times. The charge was heated at 60° C. and 25 grams of potassium persulfate dissolved in 800 mls. of distilled water were added. After 20 minutes polymerization started and a mixture of 2.7 pounds lauryl mercaptan and 57.3 pounds styrene was fed in accordance to the schedule 0–60 minutes, 0.272 pound/min.; 60–100 minutes, 0.188 pound/min.; 100–150 minutes, 0.10 pound/min.; 150–190 minutes, 0.059 pound/min.; and 190–230 minutes, 0.032 pound/min. After 230 minutes, the run was stopped with a solution of 14 grams hydroquinone monomethyl ether in 400 mls. of methanol. 248.3 pounds of this polymer latex were mixed with 71 pounds of a grafted rubber latex (the grafted rubber consisted of 36.4 percent of acrylonitrile/styrene copolymer and 63.6 percent styrene/butadiene rubber) prepared according to the procedure of Example III using the reactor of Example I. The coagulated and dried composition contained 12 percent by weight of the styrene-butadiene rubber.

The mixture was coagulated with magnesium sulfate in proportion such that the final product contained 12 percent by weight rubber and 70.9 percent by weight acrylonitrile polymerized units. This determination was by gas chromatography.

The washed, dried, powdered blend was extruded through a 53-mm. extruder at a melt temperature of 195° C. at a rate of 18 pounds per hour. The power utilized was only 36 percent of the capacity. The polymer portion of the blend as distinguished from the grafted rubber had a melt viscosity of $3.3\times10^5$ poises at 220° C. and an inherent viscosity of 0.92 gram per deciliter in dimethyl formamide. A sample of this blend was compression molded at 220° C. to a film 7.5 mils thick. The permeability to carbon dioxide of the blend was 0.0074 barrer.

EXAMPLE V

The data which is given below in Table III was obtained on compositions which were prepared by the method described in Example IV for the polymer.

TABLE III

| Sample number | Percent AN | | Inherent viscosity, $\eta_{ink}$, BLO 35° C. | Melt | |
|---|---|---|---|---|---|
| | Wt. | Mole | | Viscosity, $\eta_0$, 220° C. | Stability, $T_2$ (minutes) |
| 1 | 76.7 | 86.6 | 0.60 | $4.2.10^4$ | 13 |
| 2 | 76.7 | 86.6 | 0.58 | $2.8.10^4$ | 11 |
| 3 | 77.0 | 86.8 | 0.58 | $3.2.10^4$ | 14 |
| 4 | 76.8 | 86.6 | 0.53 | $4.2.10^4$ | 16 |
| 5 | 78.2 | 87.6 | 0.52 | $3.0.10^4$ | 76 |
| 6 | 76.4 | 86.4 | 0.40 | $5.0.10^4$ | 12 |
| 7 | 77.0 | 86.8 | 0.55 | $2.4.10^4$ | 13 |
| 8 | 76.9 | 86.7 | 0.60 | $1.2.10^5$ | 41 |
| 9 | 79.0 | 88.1 | 0.43 | $5.0.10^4$ | 311 |

NOTE.—BLO = γ-butyrolactone.

What is claimed is:

1. An emulsion polymerization process comprising (1) polymerizing acrylonitrile and an aromatic olefin selected from the class consisting of styrene; 4-methyl styrene; 4-(t-butyl)-styrene; 3-methyl styrene; 2,4-dimethyl styrene; 2,6-dimethyl styrene and 2,4-diisopropyl styrene, or α-methyl styrene in combination with said olefin, in the presence of a suitable amount of emulsifier and a free radical initiator, adding said olefin alone or said olefin and acrylonitrile to the reaction medium throughout said polymerization, controlling said addition of said olefin or said olefin and acrylonitrile to the reaction medium to continuously maintain a ratio of said olefin to acrylonitrile in the reaction medium within 25 percent of the ratio required to be maintained to produce a polymer with an average composition selected from 76 to 85 percent by weight acrylonitrile and 24 to 15 percent by weight of said olefin and recovering a polymer having said average composition, an inherent viscosity of 0.3 to 1.0 deciliter per gram as measured on a 0.5 deciliter per gram solution of the polymer in gamma-butyrolactone at 35° C., a melt viscosity of $10^4$ to $10^6$ poise at 220° C. and a carbon dioxide permeability of less than 0.02 barrer, (2) polymerizing 30 to 50 percent by weight of a graft polymer consisting essentially of 76 to 85 percent by weight acrylonitrile polymerized units and 24 to 15 percent polymerized units of at least one aromatic olefin selected from the class consisting of styrene; 4-methyl styrene; 4-(t-butyl)-styrene; 3-methyl styrene; 2-,4-dimethyl styrene; 2,6-dimethyl styrene and 2,4-diisopropyl styrene, or α-methyl styrene in combination with said olefin, prepared according to the process in (1) with 50 to 70 percent by weight rubber; (3) blending 65 to 100 percent by weight of the polymer of (1) with 0 to 35 percent by weight of polymer (2); and (4) recovering a polymer having a carbon dioxide permeability of less than 0.045 barrer.

2. The process of Claim 1 wherein the aromatic olefin is styrene.

3. The process of Claim 2 wherein the aromatic olefin additionally consists of α-methyl styrene.

4. The process of Claim 2 in which the rubber comprises 50 to 100 percent by weight conjugated diene polymerized units and 0 to 50 percent by weight polymerized units selected from the class consisting of styrene polymerized units, acrylonitrile polymerized units, and mixtures thereof.

5. The process of Claim 4 in which the conjugated diene is selected from the class consisting of butadiene and isoprene.

6. The process of Claim 1 in which the polymer of (1) is selected from 78 to 82 percent by weight acrylonitrile polymerized units and 22 to 18 percent by weight styrene polymerized units and the melt viscosity of the polymer of (1) is $2\times10^4$ to $4\times10^5$ poises at 220° C. and the graft polymer of (2) is selected from 76 to 82 percent by weight acrylonitrile polymerized units and 24 to 18 percent by weight styrene polymerized units.

7. The process of Claim 5 in which (2) is 10 to 20 percent by weight of the composition.

8. A polymer composition prepared by an emulsion polymerization process comprising (1) polymerizing acrylonitrile and an aromatic olefin selected from the class consisting of styrene; 4-methyl styrene; 4-(t-butyl)-styrene; 3-methyl styrene; 2,4-dimethyl styrene; 2,6-dimethyl styrene and 2,4-diisopropyl styrene, or α-methyl styrene in combination with said olefin, in the presence of a suitable amount of emulsifier and a free radical initiator, adding said olefin alone or said olefin and acrylonitrile to the reaction medium throughout said polymerization, controlling said addition of said olefin or said olefin and acrylonitrile to the reaction medium to continuously maintain a ratio of said olefin to acrylonitrile in the reaction medium within 25 percent of the ratio required to be maintained to produce a polymer containing an average composition selected from the range of 76 to 85 percent by weight acrylonitrile and 24 to 15 percent by weight of said olefin said polymer having an inherent viscosity of 0.3 to 1.0 deciliter per gram as measured on a 0.5 deciliter per gram solution of the polymer in gamma-butyrolactone at 35° C., a melt viscosity of $10^4$ to $10^6$ poises at 220° C. and a carbon dioxide permeability of less than 0.02 barrer, (2) polymerizing 30 to 50 percent by weight of a graft polymer consisting essentially of 76 to 85 percent by weight acrylonitrile polymerized units and 24 to 15 percent polymerized units of at least one aromatic olefin selected from the class consisting of styrene; 4-methyl styrene; 4-(t-butyl)-styrene; 3-methyl styrene, 2,4-dimethyl styrene; 2,6-dimethyl styrene and 2,4-diisopropyl styrene, or α-methyl styrene in combination with said olefin, prepared according to the process in (1) with 50 to 70 percent by weight rubber, (3) blending 65 to 100 percent by weight of the polymer of (1) with 0 to 35 percent by weight of polymer (2), (4) recovering a polymer having a carbon dioxide permeability of less than 0.045 barrer.

9. The polymer of Claim 8 wherein the ratio of said olefin to acrylonitrile required to produce the selected acrylonitrile/olefin composition is in the range of 0.016 to 0.009 and the addition of said olefin or said olefin and acrylonitrile is controlled to maintain the ratio within 25 percent of the ratio selected.

10. The polymer of Claim 9 wherein said ratio is maintained within 12.5 percent of said range.

11. The polymer of Claim 9 wherein the aromatic olefin is styrene.

12. The polymer of Claim 8 wherein the acrylonitrile weight percent is 78 to 82 and the olefin weight percent is 22 to 18 and the melt viscosity is $2\times10^4$ to $4\times10^5$ poises at 220° C.

13. The polymer of Claim 8 in the form of a shaped article.

14. The polymer of Claim 13 in the form of an oriented shaped article.

15. The article of Claim 13 in the form of a bottle.

16. The article of Claim 14 in the form of a bottle.

References Cited

UNITED STATES PATENTS 3,451,538 6/1969 Trementozzi ------ 260—876 R

FOREIGN PATENTS 1,186,361 4/1970 Great Britain ------- 260—876

MURRAY TILLMAN, Primary Examiner

J. ZIEGLER, Assistant Examiner

U.S. Cl. X.R.

260—29.6 AN, 85.5 HC, 85.5 P, 879

UNITED STATES PATENT OFFICE
CERTIFICATE OF CORRECTION

PATENT NO. 3,819,762

DATED : June 25, 1974

INVENTOR(S) : King Lau Howe

It is certified that error appears in the above-identified patent and that said Letters Patent are hereby corrected as shown below:

| Patent Column | Line | Correction |
|---|---|---|
| 8 | 7 | "gram per deciliter" should be -- deciliter per gram --. |
| 8 | 50-51 | "deciliter per gram" should be -- gram per deciliter --. |
| 9 | 37 | "deciliter per gram" should be -- gram per deciliter --. |

Signed and Sealed this

Nineteenth Day of October 1976

[SEAL]

*Attest:*

RUTH C. MASON
*Attesting Officer*

C. MARSHALL DANN
*Commissioner of Patents and Trademarks*